F. L. BATES.
Nut-Locks.
No. 156,722.  Patented Nov. 10, 1874.
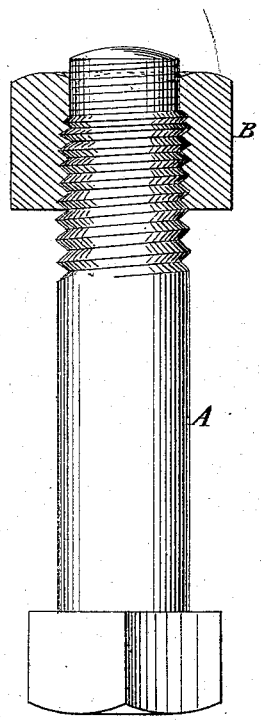
WITNESSES:
A. W. Almquist
Alex F. Roberts
INVENTOR:
F. L. Bates
BY Munn & Co
ATTORNEYS.

UNITED STATES PATENT OFFICE.

FINIS L. BATES, OF CARROLLTON, MISSISSIPPI.

IMPROVEMENT IN NUT-LOCKS.

Specification forming part of Letters Patent No. 156,722, dated November 10, 1874; application filed August 22, 1874.

*To all whom it may concern:*

Be it known that I, FINIS L. BATES, of Carrollton, Carroll county, Mississippi, have invented a new and useful Improvement in Nut-Locks, of which the following is a specification:

The object of this invention is to provide efficient means for preventing the nuts of screw-bolts from working off by means of the jarring or vibration to which the parts held by the bolt are subjected; and it consists in a nut, having a screw-thread which does not extend through the nut, but acts as a smoother to cut the outer threads from the bolt and bind the nut.

The drawing illustrates my invention.

A is the bolt. B is the nut. In cutting the bolt the thread is cut, as in the ordinary bolts, flush with the end. In cutting the thread through the nut the tap is not passed clear through, but, being a plug-tap, it is stopped so as to leave about one-fourth of the distance through the nut uncut, as seen in the drawing. When the nut is turned on, the uncut portion of the nut strips the outer threads of the screw, or bevels them down even with the surface of the body of the bolt. This binds the nut on the bolt, so that it cannot be started back without a great exertion of force. If, by means of wear or shrinkage, the bolt should be loosened, the nut can be turned up still further, and the bolt tightened with the same result.

In ordinary cases two or three threads of the bolt forced down in this manner will be sufficient to bind the nut; but I do not confine myself to any particular number of threads or length of space.

Having thus described my invention, I claim as new and desire to secure by Letters Patent—

A nut, having its threaded portion extending partly through the aperture, in combination with an ordinary screw-bolt, so that, when the nut is applied, the uncut portion of the aperture of the nut will strip one or more threads from the bolt, substantially as and for the purpose specified.

FINIS L. BATES.

Witnesses:
 JOS. J. GEE,
 JOHN MONEY.